(12) United States Patent
Schiffmann et al.

(10) Patent No.: US 7,915,325 B2
(45) Date of Patent: Mar. 29, 2011

(54) ANTIMICROBIAL FOOD PACKAGING

(75) Inventors: Jürgen Schiffmann, Hennef (DE); Helmut Schlösser, Wachtberg (DE)

(73) Assignee: Kuhne Anlagenbau GmbH, St. Augustin/Menden (DE)

( * ) Notice: Subject to any disclaimer, the term of this patent is extended or adjusted under 35 U.S.C. 154(b) by 80 days.

(21) Appl. No.: 12/444,235

(22) PCT Filed: Oct. 8, 2007

(86) PCT No.: PCT/EP2007/008695
§ 371 (c)(1),
(2), (4) Date: Apr. 3, 2009

(87) PCT Pub. No.: WO2008/043501
PCT Pub. Date: Apr. 17, 2008

(65) Prior Publication Data
US 2010/0047302 A1    Feb. 25, 2010

(30) Foreign Application Priority Data
Oct. 6, 2006   (DE) .................. 10 2006 047 801

(51) Int. Cl.
*C08K 3/08* (2006.01)
*C08K 5/098* (2006.01)
*B32B 5/08* (2006.01)

(52) U.S. Cl. ........ 523/122; 524/394; 524/399; 524/401; 524/403; 524/439; 428/458

(58) Field of Classification Search .................. 523/122; 524/394, 399, 401, 403, 439; 428/458
See application file for complete search history.

(56) References Cited

U.S. PATENT DOCUMENTS

| | | | |
|---|---|---|---|
| 6,179,141 B1 | 1/2001 | Nakamura | |
| 2005/0228103 A1* | 10/2005 | Bringley et al. | 524/445 |
| 2006/0182851 A1* | 8/2006 | Kastl | 426/138 |
| 2009/0035341 A1 | 2/2009 | Wagener et al. | |

FOREIGN PATENT DOCUMENTS

| | | |
|---|---|---|
| DE | 20 2004 006 472 U1 | 8/2004 |
| DE | 10 353 756 A1 | 6/2005 |
| EP | 1 403 192 A1 | 3/2004 |
| WO | 2004/073400 A3 | 9/2004 |
| WO | 049699 A2 | 2/2005 |
| WO | 048708 A1 | 6/2005 |
| WO | 2005/099782 A2 | 10/2005 |

OTHER PUBLICATIONS

Chinese Patent Office, Office Action dated Mar. 31, 2010 in reference to co-pending Chinese Application No. 200780037380.4.
Chinese Patent Office, Office Action dated Sep. 9, 2010 in reference to co-pending Chinese Application No. 200780037380.4
New Zealand Patent Office, Examination Report dated Aug. 17, 2010 in reference to co-pending New Zealand Application No. 575628.
Russian Patent Office, Office Action dated Apr. 2010 in reference to Russian Application No. 2009113705/13(018745).

* cited by examiner

*Primary Examiner* — Kriellion A Sanders
(74) *Attorney, Agent, or Firm* — Dinsmore & Shohl, LLP

(57) ABSTRACT

The present invention relates to a single or multi layered food packaging on the basis of plastics wherein the layer or at least one of the layers comprises at least one metal with antimicrobial activity and wherein at least part of the metal with antimicrobial activity is present in finely divided metallic form and the remaining part is present in form of a salt.

20 Claims, No Drawings

ANTIMICROBIAL FOOD PACKAGING

The present invention relates to a single- or multi-layered food packaging on the basis of plastic materials, in particular, the invention relates to a food packaging wherein the layer or at least one of the layers comprises a metal with antimicrobial activity.

The durability of meat, sausage, and cheese products is limited, inter alia, due to the growth of microbes within the package and it is a constant aim to increase the durability of these products by taking appropriate measures. Appropriate measures comprise packing under sterile conditions and adding preserving agents to the product to be packed.

An additional or further possibility of effectively suppressing the growth and/or the multiplication of microbial germs is to dope the packaging material or the coating of the same with substances with antimicrobial activity. Generally, in the present specification "antimicrobial" or "with antimicrobial activity" describes the activity against microorganisms, in particular against bacteria, yeasts, mildew, and fungi. Of particular importance in this connection is the activity against bacteria such as coliform bacteria, salmonellae, and staphylococcae.

The possibilities of doping and/or coating are, however, associated with some disadvantages because it has to be assumed that the employed antimicrobial substances, even in slightest amounts, are released from the plastic materials into the packed goods. The employed substances, therefore, have to be harmless or unobjectionable for the organism. A further disadvantage is that the processing of thermoplastic materials occurs at relatively high temperatures. This limits the use of organic substances with antimicrobial activity which are added in-situ, since they change irreversibly at the usual process temperatures.

Thus, the use of the antimicrobial activity of metal ions, which activity is known as such, lends itself to avoid the aforementioned disadvantages, in particular, the antimicrobial activity of silver, tin, copper, and zinc ions.

It is known that polymers may show antimicrobial effects at their surfaces due to metal ions, in particular $Ag^+$, $Sn^{2+}$, $Cu^+$, and $Zn^{2+}$. However, a certain mobility of the metal ions in the polymeric matrix is a prerequisite therefor, which usually is achievable when the matrix material has a certain capacity for the uptake of water. This generally known effect is also employed in the packaging industry.

DE 193 006 A1 discloses the manufacture of a food packaging on the basis of plastic materials furnished with antimicrobial activity, in particular for sausages or sausage products. According to the disclosure silver, copper, or zinc ions are preferably added to the primary molten mass in form of a metal salt before extruding, wherein the food packaging on the basis of plastic materials is a wrapper of polyamide.

It is of particular disadvantage in the aforementioned food packaging that the metal ions with antibacterial activity have to be introduced into the metal ion bearing layer in the form of a salt, exclusively disclosed are metal oxides, i.e. as solids. In order to guarantee sufficient strength of the food packaging it is required that the layer containing the metal ions has a thickness that is at least somewhat larger than the particle diameter of the metal oxides employed. At the same time the processing of the so-called master batch, i.e. of the polymer-metal salt-mixture used for the manufacture of the food packaging, is connected to problems of sedimentation and agglomeration. Of particular disadvantage in the prior art is, therefore, generally the processing of the metal salts with antimicrobial activity as solids with relatively large particle diameters in the range of μm (microns).

It is therefore object of the present invention to at least provide a further food packaging that can be manufactured conveniently and at low cost, which has sufficient strength and durability, and which avoids the problems of the prior art as far as possible.

It is further object of the present invention to provide a method for the manufacture of such a food packaging.

The present objects are achieved by a single- or multi-layered food packaging on the basis of plastic materials with the features of appended claim 1, as well as by a method for the manufacture of such a food packaging according to claim 14. Preferred embodiments of the food packaging and for the method for the manufacture of the same are subject-matter of the dependent claims referring to the independent claims.

The particular advantage of the food packaging lies in the fact that the at least one metal with antimicrobial activity is included in the layer or sheet containing the at least one metal in a very fine and regularly distributed form and that the metal particles have a very small diameter in the range of nanometers (nm). Therefore the thickness of the sheet or layer containing the at least one metal can be kept particularly small without, for example, impairing the strength and durability of the food packaging compared to those of the prior art.

In a preferred embodiment of the present invention the metal is present in form of a colloid with oligodynamic effect. The employed metal is preferably selected from the group consisting of Ag, Cu, Sn, Zn, and mixtures thereof.

Although the food packaging of the present invention may have a single-layered structure, it preferably has a multi-layered structure, particularly preferred the multi-layered food packaging has a three-, five-, or seven-layered structure.

In case the food packaging of the present invention has a multi-layered structure it is particularly advantageous when the food packaging has a asymmetric structure because particular functions or effects of single layers, like that as an $O_2$-barrier, is related to the sequence of layers arranged at the place where it can best unfold its effect. It is particularly preferred that the metal is included in the layer or the layers of the food packaging facing the product. This arrangement allows to effectively prevent the intrusion of microbial germs as well as to at least delay or restrict the multiplication or the distribution of the same on the surface of the packed foodstuffs.

The food packaging according to the present invention is a tubular film or a flat film or sheet. It is preferably formed to be tubular, in particular seamless tubular. Food packagings of such a seamless tubular kind are commonly known and generally produced by a blown film extrusion process with appropriate ring nozzles. They are particularly useful for the packing of sausages but may also be used for the packing of meat, cheese products and the like.

It is generally preferred that the metal with antimicrobial activity is contained in a concentration of from 50 to 500 ppm, relative to the metal containing layer, preferably from 70 to 350 ppm and particularly preferred from 100 to 200 ppm.

Generally, the food packaging or at least a layer thereof may further comprise a stabiliser which is preferably selected from polyvinyl pyrrolidone (PVP), sodium dodecyl sulphate, and mixtures thereof.

Basically, the food packaging according to the present invention can be made from any suitable polymer. It is, however, preferred that the layers of the food packaging are those on the basis of polyolefin, adhesive, EVOH, polyvinyl alcohol (PVA) and/or polyamide in case the food packaging has a multi-layer structure. The food packaging according to the present invention is particularly characterised in that it is of comparably small thickness. It has a generally preferred overall thickness of 10 to 150 µm, particularly preferred a thickness of 20 to 80 µm.

It is particularly preferred when the metal containing layer of the food packaging according to the present invention has a thickness of 2 to 50 µm, in particular a thickness of 5 to 20 µm. This layer thickness is quite advantageously obtainable by the process according to the present invention which is generally described in the following.

In an also particularly preferred embodiment the food packaging according to the present invention is a flat sheet which may e.g. be used as an intermediate or separation layer for cold cuts of sausages, meat or cheese. Although, generally, a asymmetric structure is possible it is preferred when the flat sheet is of a symmetric structure so that both of the surfaces making contact to foodstuff are formed of a metal containing layer.

The food packaging according to the present invention is generally produced according to a well-known extrusion process. It is of particular advantage in said extrusion process that the metal is added during said extrusion process in form of a colloid as a concentrated solution. In this way it can be particularly easily and uniformly distributed in the respective layer of the food packaging by intense admixture in the extruder, which is a prerequisite for good efficiency. As described in more detail hereinafter a respective solution of a metal salt is used as starting substance, wherein the cations a reduced in solution under the formation of a colloid. In this manner a relatively small particle diameter is obtainable, which in turn allows for a small thickness of the layer containing the at least one metal.

When practising the process according to the present invention e.g. sedimentation problems and problems due to a too large particle diameter, like limited mechanical durability of the food packaging and a too large layer thickness of the layer containing the at least one metal, are mostly and advantageously and in accordance with the present invention avoided by starting from a solution of the respective metal salt.

It is preferred for this purpose to dissolve a respective metal salt in an organic solvent like e.g. tri- or diethylene glycol, preferably triethelene glycol, and heat to a temperature of more than 50° C., preferably to more than 100° C. to 150° C., upon which a reduction occurs which is recognisable by a change of colour. The formation of colloidal metal particles in finest distribution with small particle size apparently present in a colloidal suspension in the solution is essential for the invention. The solution of the metal salt thus reduced is, also because of its comparatively low storage stability, preferably processed further directly.

The colloidal suspension described herein before and having a metal portion of preferably 1 to 3% by weight is then added into an appropriate extruder via a degassing module. This ensures that a major part of the carrying liquid or all of it can evaporate, a uniform distribution of the metal occurs in the polymer used for forming the metal containing layer, and the formation of bubbles is avoided. A potentially possible agglomeration of the metal particles is, according to a preferred embodiment of the process according to the present invention, additionally avoided by the add-on of a stabiliser. As stabiliser polyvinyl pyrrolidone (PVP) which is unobjectionable for applications in connection with foodstuffs, minor amounts of sodium dodecylsulfate or mixtures thereof are preferably used. PVP is particularly preferred.

Ideally the processing takes place in a single-screw extruder or a twin-screw extruder whereby a particularly good distribution of the metal in the polymer is obtained.

The addition of the metal suspension is effected, inter alia depending on the polymer chosen for the metal containing layer, generally at a temperature of 150 to 250° C., preferably at a temperature of 180 to 220° C.

Without being bound to a specific theory it is assumed that the advantageous and surprising effects according to the present invention are obtained due to the fact that the metal ions present in solution are reduced and the emerging metal nuclei are stabilised colloidally at the same time so that a suspension is formed comprising metal or metal particles in the range of nanometers in finest distribution.

By adding this suspension to the polymer melt and concomitant evaporation of the employed solvent a commensurate finest distribution of the metal particles in the polymer layer is achieved. When the metal containing layer then takes up water under ambient conditions, metal ions with antimicrobial activity are subsequently formed in the thus produced food packaging under the existing conditions which metal ions then diffuse due to the moisture content of the metal containing layer to unfold their antimicrobial activity.

It has to be noted that the advantageous effects of the present invention are essentially ascribed to the finest distribution of the metal in the polymer layer. For this it is not necessarily required that the metal is present in an uncharged state. The inventive concept may e.g. also be achieved by incorporating respective metal salts in the polymer layer in form of a finest distribution from a solution without reducing them. The term "metal" as used within the framework of the present invention therefore comprises cations of metals with antimicrobial activity as well as their uncharged form.

The invention generally described herein before is exemplified in more detail in the following wherein the embodiments of the invention are only intended for a better understanding of the invention and by no means to limit the same.

EXAMPLE 1

First, 100 ml diethylene glycol (DEG) are heated under reflux and allowed to cool to room temperature. 1 g of $AgNO_3$ is dissolved therein. The solution is subsequently heated in a water bath. The initially yellowish solution turns into a pale grey colour above 50° C. which has to be considered as indicative for the formation of agglomerated silver particles. This solution is concentrated and admixed to polymer granulate material and fed into a twin-screw extruder and the processed to a middle layer of a multi-layer tubular film by co-extrusion.

EXAMPLE 2

First, 100 ml triethylen glycol (TEG) are heated under reflux for one hour. After cooling to 150° C. 5 ml of a 0.1 molar solution of $AgNO_3$ and a 0.2 molar solution of polyvinyl pyrrolidone (PVP with a molar mass of 20,000), respectively, are concomitantly added slowly under vigorous stirring. The forming suspension is added as addition agent during tube extrusion in such a way that the concentration of Ag is 50 ppm, relative to the polymer weight of the inner layer contacting the product. The addition is effected at a temperature in the range of 180 to 220° C.

EXAMPLE 3

In 100 ml triethylen glycol (TEG) 10 g PVP are dissolved at 150° C. The PVP used has a molar mass in the range of 6,000 to 20,000. Subsequently, 1 to 5 g $AgNO_3$ are dissolved in further 100 ml TEG under stirring and heating and in the presence of the surfactant sodium dodecyl sulphate (1 to 5 g). The surfactant is able to sufficiently stabilise part of the silver nuclei formed and inhibit their further growth. The remaining part of the silver particles grows to coarser particles which are also stabilised by enclosure upon addition of the PVP-TEG/ PVP solution after half an hour to 24 hours, preferably after one to five hours.

The emerging bimodal particle size distribution leads to a strong short-time effect due to the portion of the smaller particles. In contrast thereto the coarser fraction causes an inhibition of bacteria for longer periods of time due to a kind of repository effect.

The suspension thus formed is added to a polymer during tube extrusion in such a way that the concentration of silver amounts to 50 to 500 ppm, preferably 100 to 200 ppm, relative to the polymer mass of the inner layer contacting the product. The addition is effected via a degassing module at a temperature in the range of 180 to 220° C.

EXAMPLE 4

The antimicrobial activity of the food packaging according to the present invention was assessed on three films produced according to example 3. The results are specified in the following table.

|  | Film 1 | Film 2 | Film 3 |
| --- | --- | --- | --- |
| Concentration of Ag in the layer contacting the product | 0 ppm | 320 ppm | 80 ppm |
| 0 days | 1.0 E+04 | 1.0 E+04 | 1.0 E+04 |
| Concentration of bacteria after 7 days | 3.5 E+04 | 1.25 E+04 | 5.0 E+04 |
| Concentration of bacteria after 14 days | 2.98 E+09 | 2.0 E+07 | 3.8 E+08 |
| Concentration of bacteria after 21 days | 6.5 E+10 | 3.5 E+08 | 2.0 E+08 |

The invention claimed is:

1. A food packaging comprising at least one layer comprising a plastic material, wherein:
   at least one of the layers defines a product face;
   at least one of the layers defines an external face opposite the product face;
   at least one of the layers comprises at least one metal with antimicrobial activity;
   at least one first portion of the at least one metal comprises a fine distribution of particles of the at least one metal in metallic form; and
   at least one second portion of the at least one metal comprises a salt of the at least one metal.

2. The food packaging according to claim 1, wherein the at least one first portion comprises a colloid of the at least one metal in metallic form, the colloid having an oligodynamic effect.

3. The food packaging according to claim 1, wherein the at least one metal is selected from the group consisting of Ag, Cu, Sn, Zn, and mixtures thereof.

4. The food packaging according to claim 1, wherein the at least one layer comprises a plurality of layers.

5. The food packaging according to claim 1, wherein the packaging defines an asymmetric structure.

6. The food packaging according to claim 1, wherein at least one of the layers defining the product face or at least one of the layers defining the external face comprises the at least one metal.

7. The food packaging according to claim 1, wherein the food packaging is a tubular film or a flat sheet.

8. The food packaging according to claim 1, wherein the at least one layer comprising the at least one metal comprises by weight 50 ppm to 500 ppm of the at least one metal.

9. The food packaging of claim 1, wherein the food packaging or at least one of the layers further comprises a stabilizer.

10. The food packaging according to claim 9, wherein the stabilizer is selected from the group consisting of polyvinyl pyrrolidone, sodium dodecyl sulfate, and mixtures thereof.

11. The food packaging according to claim 1, wherein the plastic material comprises a material selected from the group consisting of polyolefin, adhesive, ethylene vinyl alcohol (EVOH), polyvinyl alcohol, polyamide, and mixtures thereof.

12. The food packaging according to claim 1, wherein the food packaging defines an overall thickness of 10 μm to 150 μm.

13. The food packaging according to claim 1, wherein the at least one layer containing the at least one metal defines a thickness of 2 μm to 50 μm.

14. A process for the manufacture of a food packaging, the process comprising:
   providing a concentrated suspension of reduced colloidal metal in metallic form;
   providing a plastic material;
   forming a polymer melt comprising the concentrated suspension and the plastic material; and
   coextruding the concentrated suspension and the plastic material in the polymer melt with an extruder to form the food packaging as a tubular film or a flat sheet comprising at least one layer containing the colloidal metal in metallic form.

15. The process according to claim 14, wherein the providing of the concentrated suspension comprises:
   providing a precursor solution comprising at least one metal salt and at least one organic solvent;
   reducing the at least one metal salt to form a colloidal suspension of metal particles;
   adding the colloidal suspension to a degassing module connected to the extruder;
   evaporating at least a portion of the at least one organic solvent to form the concentrated suspension; and
   transferring the concentrated suspension into the extruder.

16. The process according to claim 15, wherein the at least one organic solvent comprises triethylene glycol and wherein the reducing comprises heating the precursor solution at a temperature of 100° C. to 150° C.

17. The process according to claim 15, wherein the transferring of the concentrated suspension comprises using a dosing pump during the coextruding to uniformly distribute the concentrated suspension within the polymer melt.

18. The process according claim 17, wherein the extruder is a single-screw extruder or a twin-screw extruder.

19. The process according to claim 15, wherein the transferring is conducted at a temperature of 150° C. to 250° C.

20. A process for the manufacture of a food packaging, the process comprising:
   providing a precursor solution comprising at least one metal salt and at least one organic solvent;
   reducing the at least one metal salt to form a colloidal suspension of metal particles in metallic form;
   adding the colloidal suspension to a degassing module;

evaporating at least a portion of the at least one organic solvent from the colloidal suspension to form a concentrated suspension of reduced colloidal particles in metallic form;

loading a plastic material into the extruder;

transferring the concentrated suspension from the degassing module into the extruder;

forming a polymer melt comprising the plastic material and the concentrated suspension; and coextruding the concentrated suspension and the plastic material from the polymer melt to form the food packaging as a tubular film or a flat sheet, the tubular film or flat sheet having at least one layer containing the colloidal metal, wherein the transferring of the concentrated suspension is performed using a dosing pump during the coextruding to uniformly distribute the concentrated suspension within the polymer melt.

* * * * *